(12) United States Patent
Jukes (10) Patent No.: US 11,414,738 B2
(45) Date of Patent: Aug. 16, 2022

(54) MANUFACTURE OF A STRESS RELIEVED LENGTH OF STEEL HAVING AN OXIDISED SURFACE LAYER

(71) Applicant: LIBERTY PERFORMANCE STEELS LIMITED, London (GB)

(72) Inventor: Carl Jukes, West Bromwich (GB)

(73) Assignee: Liberty Performance Steels Limited, West Bromwich (GB)

( * ) Notice: Subject to any disclaimer, the term of this patent is extended or adjusted under 35 U.S.C. 154(b) by 677 days.

(21) Appl. No.: 16/341,950

(22) PCT Filed: Sep. 28, 2017

(86) PCT No.: PCT/GB2017/052914
§ 371 (c)(1),
(2) Date: Apr. 15, 2019

(87) PCT Pub. No.: WO2018/069669
PCT Pub. Date: Apr. 19, 2018

(65) Prior Publication Data
US 2019/0242002 A1 Aug. 8, 2019

(30) Foreign Application Priority Data
Oct. 14, 2016 (GB) .................................. 1617486.4

(51) Int. Cl.
*C23C 8/18* (2006.01)
*C21D 1/76* (2006.01)
(Continued)

(52) U.S. Cl.
CPC .................. *C23C 8/18* (2013.01); *C21D 1/76* (2013.01); *C21D 9/0062* (2013.01); *C21D 9/24* (2013.01);
(Continued)

(58) Field of Classification Search
CPC .......... C23C 8/18; C21D 1/76; C21D 9/0062; C21D 9/24; C21D 9/561; C21D 9/565; C21D 9/573; C21D 9/60
See application file for complete search history.

(56) References Cited

U.S. PATENT DOCUMENTS 2,768,916 A * 10/1956 Seabold .................... C23C 8/12
148/287
7,371,296 B1 5/2008 Johnston
(Continued)

FOREIGN PATENT DOCUMENTS

JP H0273921 3/1990

*Primary Examiner* — Scott R Kastler
(74) *Attorney, Agent, or Firm* — Renner Kenner Greive Bobak Taylor & Weber (57) ABSTRACT

An apparatus for manufacturing a stress relieved length of steel having an oxidised surface layer includes: a heating chamber; a reaction chamber coupled to the heating chamber; and a conveying mechanism conveying the length of steel along a path through the heating chamber and reaction chamber. The heating chamber includes a heating apparatus arranged to heat the length of steel in a heating portion of the path. The apparatus further includes a control means including a sealed unit defined by the heating chamber and the reaction chamber and arranged to control both the temperature of the length of steel and the atmosphere to which the length of steel is exposed in an oxidisation portion of the path within the reaction chamber in which the oxidised surface layer is formed. A method of manufacturing a stress relieved length of steel having an oxidised surface layer is also disclosed.

18 Claims, 2 Drawing Sheets

(51) Int. Cl.
*C21D 9/573* (2006.01)
*C21D 9/00* (2006.01)
*C21D 9/24* (2006.01)
*C21D 9/56* (2006.01)
*C21D 9/60* (2006.01)

(52) U.S. Cl.
CPC ............ *C21D 9/561* (2013.01); *C21D 9/565* (2013.01); *C21D 9/573* (2013.01); *C21D 9/60* (2013.01)

(56) References Cited

U.S. PATENT DOCUMENTS

| | | |
|---|---|---|
| 2010/0068669 A1 | 3/2010 | Ishimoto et al. |
| 2011/0297292 A1 | 12/2011 | Bogner et al. |
| 2016/0017452 A1 | 1/2016 | Puerta Velasquez et al. |
| 2019/0242002 A1* | 8/2019 | Jukes .................... C21D 1/76 |
| 2020/0232063 A1* | 7/2020 | Crutzen ................. C21D 1/76 |

\* cited by examiner

202 Conveying the length of steel along a path through a heating chamber and an oxidisation chamber coupled to form a sealed unit.

204 Heating the length of steel in a heating portion of the path within the heating chamber.

206 Controlling both the temperature of the length of steel and the atmosphere to which the length of steel is exposed in an oxidisation portion of the path within the oxidisation chamber at which the oxidised surface layer is formed.

Figure 2

MANUFACTURE OF A STRESS RELIEVED LENGTH OF STEEL HAVING AN OXIDISED SURFACE LAYER

The present invention relates to an apparatus and method for manufacturing a stress relieved length of steel having a deliberately-oxidised surface layer.

Steel strip material having a deliberately-oxidised surface layer may be used for the production of cutting tools such as band-saw blades or the like. Before being processed to form a saw blade, the steel strip material must first be heat-treated to relieve internal stresses within the material and to deliberately generate an oxidised surface layer. Stress relieving may be performed by heating the material to pre-defined temperatures, for a set period of time (the temperature being dependent on the metal being used). The material is exposed to air so that an oxidised layer is formed on its surface (known as scale formation). The oxide layer provides a stable and adherent layer that may improve the performance of the material when used in a saw blade or the like. The oxide layer also provides a distinctive colour to the material which allows the presence and quality of the oxide layer to be identified. In addition, a degree of corrosion resistance is achieved. In the example of a steel strip, the optimum oxide surface layer is known to be formed from $Fe_3O_4$. This provides a stable layer which is not easily removed. Such a layer has a distinctive blue colour that allows it to be identified by a consumer.

Known methods of manufacturing a stress relieved steel strip material such as that described above involves heating the material in a tempering furnace before allowing the material to cool in a cooling tube. The material is exposed to ambient air within the furnace and cooling tube to allow the oxidisation reaction to occur. This method has a number of drawbacks. The oxidisation reaction can be difficult to control and the rate of production of the oxidised strip material may be slow. In the case of steel, the temperature required for the stress relieving process is higher than that at which the optimum oxide layer is produced. The opening of the furnace is relied on to provide sufficient air ingress to induce oxidisation at the optimum temperature, without the air reaching parts of the material where the temperature is not optimal for oxidation. The oxidisation process can usually only be inaccurately controlled by the speed at which material moves through the furnace and is susceptible to variations in temperature and atmosphere at the point where oxidisation occurs.

Manufacture may be achieved by processing multiple steel strands or strips together in parallel to improve the rate of production. The variability of the process may lead to a temperature differential between the strands being processed, dependent on their location within the furnace. This leads to variations in the type of oxide produced on the surface of the material, leading to issues with consistency, scale adherence (tendency to flake) and colour.

In a first aspect, the present invention provides an apparatus for manufacturing a stress relieved length of steel having an oxidised surface layer, the apparatus comprising: a heating chamber; a reaction chamber coupled to the heating chamber; and a conveying mechanism arranged to convey the length of steel along a path through the heating chamber and reaction chamber, wherein the heating chamber comprises a heating apparatus arranged to heat the length of steel in a heating portion of the path, and wherein the apparatus further comprises a control means comprising a sealed unit defined by the heating chamber and the reaction chamber, the control means arranged to control both the temperature of the length of steel and the atmosphere to which the length of steel is exposed in an oxidisation portion of the path within the reaction chamber in which the oxidised surface layer is formed.

The sealed unit of the apparatus of the present invention allows a defined oxidation portion of the path travelled by the strip material outside of the heating chamber to be created. At the oxidisation portion the temperature of the strip material and the atmosphere to which it is exposed is controlled. This allows a consistent and controlled oxidisation reaction to occur at a defined position within the apparatus. In the case of steel, this allows a uniform surface layer of $Fe_3O_4$ to be formed having the desired adherence and colour properties.

Optionally, the control means further comprises a first atmosphere controller arranged to generate a non-reactive atmosphere in the portion of the path preceding the oxidisation portion, the non-reactive atmosphere may comprise an inert gas arranged to prevent or reduce oxidisation. This may allow oxidisation to be controlled by preventing it from occurring in the portion of the path preceding the oxidisation portion.

Optionally, the first atmosphere controller comprises a first inlet arranged to provide a source of pressurised inert gas. The pressurised inert gas allows the prevention or reduction of the amount of oxygen reaching the surface of the steel strip to control oxidisation.

Optionally, the first atmosphere controller is arranged to flood the heating chamber and a controlled portion of the reaction chamber with the inert gas, and preferably the first inlet may be arranged immediately following the heating portion of the path. This allows oxidisation to be controlled in the part of the processing path in which the steel has been heated. Optionally, the inert gas may comprise nitrogen.

Optionally, the control means further comprises a second atmosphere controller arranged to generate an oxidising atmosphere in the oxidisation portion of the path, the oxidising atmosphere may comprise a source of oxygen. This allows the oxidisation to be controlled such that it takes place only in the oxidisation portion of the processing path by providing the necessary oxygen for the reaction only in this part of the processing path.

Optionally, the second atmosphere controller may comprise a second inlet arranged to provide a pressurised source of oxygen, and preferably the second inlet may be arranged to pass through a wall of the reaction chamber at a position following the start of the oxidisation portion of the path. This may allow the processing path to be flooded with oxygen in the oxidisation portion.

Optionally, the source of oxygen may comprise air. This provides an efficient source of oxygen with a water content suitable for the desired oxidisation reaction to occur.

Optionally, the second atmosphere controller is arranged to provide gas having a dewpoint of greater than 50° C. (at 80% relative humidity), resulting in a water content of greater than 88 g/kg of air. This provides suitable conditions for the desired oxidisation reaction to occur.

Optionally, the second atmosphere controller comprises a heater to heat the pressurised source of oxygen, preferable to a temperature of greater than 55° C. This may minimise the dewpoint variability and provide consistent conditions for the oxidisation reaction.

Optionally, the control means further comprises a temperature regulation means arranged to regulate the temperature of the length of steel in a first temperature regulation portion of the path, the first temperature regulation portion following the heating portion and preceding the oxidisation portion. This may allow the temperature of the length of steel reaching the oxidisation portion to be controlled to allow consistent oxidisation.

Optionally, the first temperature regulation means comprises a section of the reaction chamber adapted to separate the heating portion of the path from the oxidisation portion of the path to define the temperature regulation portion therebetween. This allows time for the steel to cool to a suitable temperature before it reaches the oxidisation portion.

Optionally, the first temperature regulation means further comprises a fluid cooling device disposed around the reaction chamber at or adjacent the first temperature regulation portion. This may advantageously allow additional control of the temperature of the steel as it reaches the oxidisation portion.

Optionally, the first temperature regulation means is arranged to regulate the length of steel to a temperature between 420° and 520° C., and preferably to about 440° C., when the length of steel reaches the oxidisation portion. This provides suitable conditions for the desired oxidisation reaction to consistently occur.

Optionally, the apparatus further comprises a viewing means adapted to allow the oxidisation portion of the path to be visible from outside of the sealed unit. This allows the ongoing oxidisation reaction to be monitored during production so the control means can be adjusted accordingly.

Optionally, the viewing means comprises at least one transparent window formed in a wall of the chamber, the transparent window being aligned with the oxidisation portion of the path. This allows the oxidisation reaction to be observed at the point of the viewing window.

Optionally, the viewing means comprises a plurality of transparent windows spaced along the length of the oxidisation chamber. This may allow observation at different points along the length of the steel strip during processing.

Optionally, the control means is arranged to control the position of the oxidisation portion along the length of the path, and preferably the control means may be arranged to control the position of the oxidisation portion such that it is visible via the viewing means. The oxidisation portion may be aligned with the viewing means so that it can be observed during production.

Optionally, the heating apparatus of the heating chamber comprises an induction heating device. This may allow rapid, efficient and controllable heating of the steel strip.

Optionally, the heating apparatus is arranged to heat the length of steel to a temperature of between 600° C. to 700° C., and preferable to a temperature of 610° C. This may allow the desired stress relieving to occur.

Optionally, the apparatus further comprises a second temperature regulation means arranged to regulate the temperature of the steel in a second temperature regulation portion of the path following the oxidisation portion. This may allow the temperature of the steel strip to reach a desired temperature for coiling or spooling.

Optionally, the second temperature regulation means is arranged to cool the steel to a temperature of less than 70° C. This provides a suitable temperature which allows the steel strip to be coiled. Optionally, the cooling means comprises one or more coolant (e.g. water) spray nozzles and/or one or more air blowers to facilitate rapidly cooling of the material below 70° C. prior to recoiling or spooling.

Optionally, the control means is arranged to control the temperature of the length of steel when in the oxidation portion of the path to about 440° C. and the atmosphere to which the length of steel is exposed in the oxidisation portion contains water/air ratio of greater than 88 g/kg. This combination has been found to provide suitable conditions for the desired oxidisation reaction to consistently occur.

Optionally, the apparatus further comprises a profile cutter arranged to cut an edge profile of the length of steel in a profile cutting portion of the path preceding the heating portion. This allows the shape of the edges of the steel to be cut using the same apparatus that provides the stress relieving and oxidisation.

Optionally, the conveying means is arranged to convey the length of steel in a continuous length along the path through the apparatus. This allows the steel to be efficiently processed in a single continuous strip.

Optionally, the conveying means is arranged to convey the length of steel at a rate of between 0.89 m/s and 1.52 m/s (175/300 ft/min), and preferably at a rate of about 1.4 m/s (275 ft/min). This provides an efficient rate of production of oxidised steel strip.

Optionally, the control means is arranged to control both the temperature of the length of steel and the atmosphere to which the length of steel is exposed to form the oxidised layer by the reaction: $3Fe+4H_2O < > Fe_3O_4+4H_2$. This oxidisation reaction provides an oxidised surface layer having the desired colour and adherence properties.

In another aspect, the present invention provides method of manufacturing a stress relieved length of steel having an oxidised surface layer, the method comprising the following steps: conveying the length of steel along a path through a heating chamber and a reaction chamber coupled to form a sealed unit; heating the length of steel in a heating portion of the path within the heating chamber; and controlling both the temperature of the length of steel and the atmosphere to which the length of steel is exposed in an oxidisation portion of the path within the oxidisation chamber at which the oxidised surface layer is formed.

Optionally, controlling the atmosphere in the oxidisation portion of the path comprises generating a non-reactive atmosphere in the portion of the path preceding the oxidisation portion, the non-reactive atmosphere may comprise an inert gas arranged to prevent or reduce oxidisation.

Optionally, generating the non-reactive atmosphere comprises injecting an inert gas, and preferably the inert gas may be injected at a position on the path immediately following the heating portion. Optionally, the inert gas comprises nitrogen.

Optionally, controlling the atmosphere in the oxidisation portion of the path further comprises generating an oxidising atmosphere in the oxidisation portion of the path, the oxidising atmosphere may comprise a source of oxygen.

Optionally, generating the oxidising atmosphere comprises injecting a source of pressurised oxygen, and preferably the pressurised source of oxygen may be injected at a point within the oxidisation chamber following the start of the oxidisation portion of the path. Optionally, the pressured source of oxygen comprises air.

Optionally, controlling the atmosphere in the oxidisation portion of the path further comprises controlling the level of water in the pressurised source of oxygen. Optionally, the level of water is controlled to be greater than 88 g/kg of air.

Optionally, controlling the atmosphere in the oxidisation portion of the path further comprises heating the pressurised source of oxygen, preferable to a temperature greater than 55° C.

Optionally, controlling the temperature of the length of steel in the oxidisation portion of the path comprises regulating the temperature of the length of steel in a first temperature regulation portion of the path, the first temperature regulation portion following the heating portion and preceding the oxidisation portion.

Optionally, regulating the temperature of the length of steel comprises spacing apart the heating portion of the path from the oxidisation portion of the path to define the first temperature regulation portion there between.

Optionally, regulating the temperature of the length of steel comprises flowing coolant through a cooling device disposed at least partly around the oxidisation chamber at or adjacent the first temperature regulation portion.

Optionally, the length of steel is regulated to a temperature of between 420° C. and 520° C. and preferably to about 440° C., when the length of steel reaches the oxidisation portion.

Optionally, the method further comprises controlling the position of the oxidisation portion along the length of the path, and preferably controlling the position of the oxidisation portion such that it is visible via a viewing means adapted to allow the oxidisation portion of the path to be visible from outside of the sealed unit.

Optionally, the viewing means comprises at least one transparent window formed in a wall of the oxidisation chamber.

Optionally, the viewing means comprises a plurality of transparent windows spaced along the length of the oxidisation chamber.

Optionally, the length of steel is heated by an induction heating device.

Optionally, the length of steel is heated to a temperature of between 600° C. and 700° C., and preferably to a temperature of 610° C.

Optionally, the method further comprises regulating the temperature of the length of steel in a second temperature regulation portion of the path following the oxidisation portion. Optionally, the regulating of the temperature of the length of steel comprises cooling the steel below 70° C.

Optionally, the temperature of the length of steel in the oxidation portion is controlled to be about 440° C. and the atmosphere to which the length of steel is exposed in the oxidisation region is controlled to contain a water/air ratio above 88 g/kg.

Optionally, the temperature of the length of steel and the atmosphere to which the length of steel is exposed are controlled to provide oxidisation by the reaction: $3Fe+ 4H_2O< >Fe_3O_4+4H_2$.

Optionally, the method further comprises cutting an edge profile of the length of steel in a profile cutting portion of the path preceding the heating portion.

Optionally, the length of steel is conveyed in a continuous length along the path through the apparatus.

Optionally, the length of steel is conveyed at a rate of between 0.89 m/s and 1.52 m/s (175/300 ft/min), and preferably at a rate of about 1.4 m/s (275 ft/min).

Embodiments of the invention will now be described, by way of example only, with reference to the accompanying drawings, in which.

Figure 1:
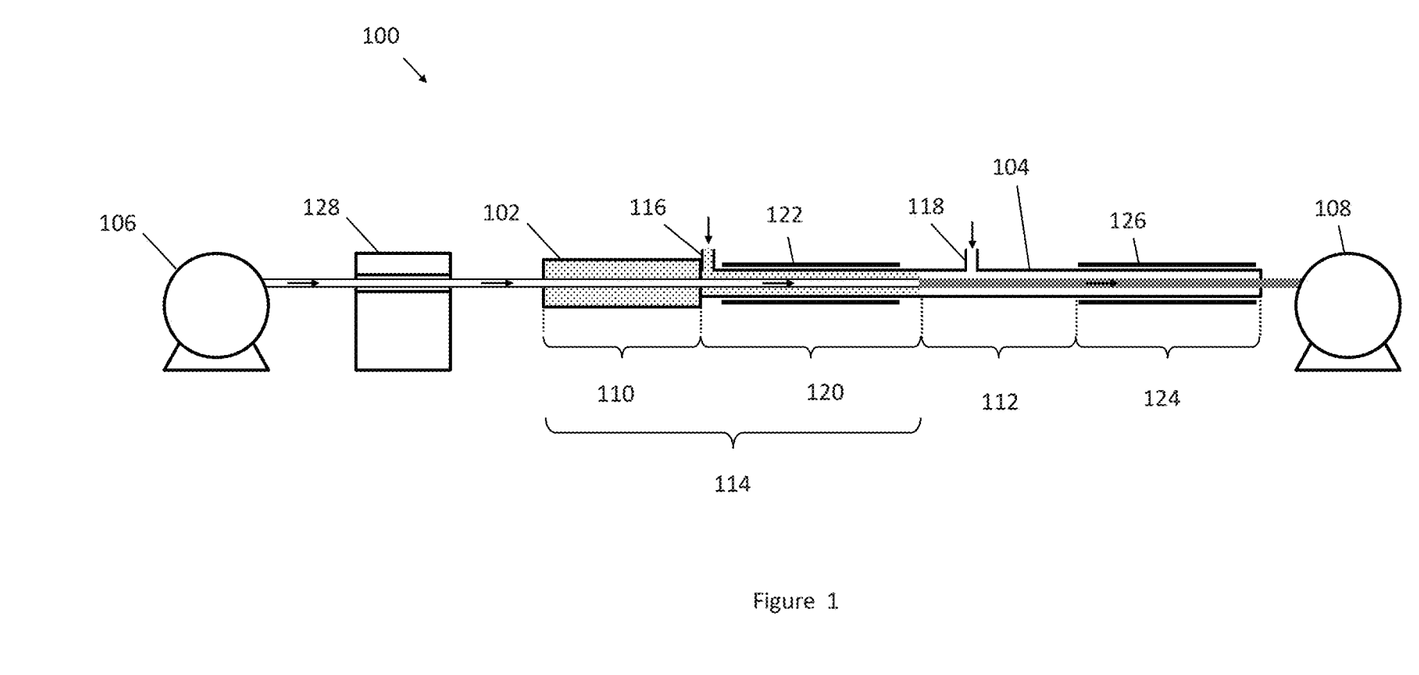
FIG. 1 is a schematic representation of an apparatus for manufacturing a stress-relieved length of steel having an oxidised surface layer according to an embodiment.

An apparatus 100 for manufacturing a stress-relieved length of steel having an oxidised surface layer is shown schematically in FIG. 1. By "stress relieved" we mean that the material has a yield point on a stress/strain curve, or it may have no coilset or has limited lateral curvature. The oxidised surface layer may be a deliberately oxidised layer and may be an adherent layer. The apparatus 100 may be a band saw production apparatus suitable for processing band saw blades that require stress-relieving and an oxidised surface layer. In this embodiment, the steel strip may be approximately 3 mm to 64 mm in width by 0.4 mm to 1.6 mm thickness in coiled lengths. The present invention is however applicable to the manufacture of lengths or strips of steel having other sizes and being suitable for other purposes, for example rule, die-rule, or knife-blade material. In other embodiments, the length of material may be made from any other metal or any other material.

The apparatus 100 generally comprises a heating chamber 102 in which the length of steel is heated to a temperature suitable for stress relieving the material. The apparatus 100 further comprises a reaction chamber 104 coupled to the heating chamber 102 in which the oxidised surface layer is generated. The apparatus 100 further comprises a conveying mechanism arranged to convey the length of steel along a processing path through the apparatus (e.g. through at least the heating chamber, reaction chamber, and cooling section if included). The conveying mechanism may comprise any mechanism suitable for moving the length of steel through the apparatus. In the described embodiment, the conveying mechanism comprises an input spool 106 arranged to provide an input feed of an un-oxidised and non-stress relieved length of steel. The input length of steel may be unwound from the input spool 106 so that it is conveyed along the processing path. An output spool 108 on which output stress relieved and oxidised steel is wound may also be provided. The conveying mechanism may further comprise a guide mechanism to guide the length of steel along the processing path. The guide mechanism may comprise one or more rollers arranged to support the length of steel at various points along the processing path. In some embodiments, one or more of the rollers may be driven to convey the length of steel. In some embodiments, surface contact is kept to a minimum once material has passed through the heating chamber 102 in order to ensure consistency and preserve the oxidised surface layer.

The heating chamber 102 may be formed by an enclosed housing in which the length of steel is heated. The heating chamber 102 may comprise an input aperture through which the length of steel may enter the enclosed chamber as it is conveyed along the processing path. The input aperture may comprise a seal arranged to allow the length of steel to pass through, while preventing the air outside the heating chamber 102 from entering. The heating chamber 102 may further comprise an output aperture through which the length of steel may pass to exit the enclosed housing. The output aperture of the heating chamber may be sealably coupled to an input aperture of the oxidisation chamber as descried below.

The heating chamber 102 may further comprise a heating apparatus arranged to heat the length of steel in a heating portion 110 of the processing path with the heating chamber 102. The heating apparatus may be arranged to heat the length of steel to a temperature at which internal stresses within the material are relieved as it passes along the heating portion of the processing path. The temperature may be chosen to provide the desired stress relieving depending on the type, size and properties of the material being processed. In some embodiments, the steel may be fully stress relieved by the heating process.

In some embodiments, the heating apparatus may comprise an induction heating device arranged to heat the length of steel by electromagnetic induction. This may provide quick and accurate heating of the steel material and may allow the length of steel to be conveyed along the processing path at a greater rate compared to if using other heating devices. By using an induction heating device the apparatus 100 can be started up quickly, or can respond to adjustments made to the desired temperature, compared to using a heating element or the like. Furthermore, the use of an induction heating device may avoid the need to wait for the heating apparatus to cool when it is no longer in use. In other embodiments, the heating apparatus may comprise any other suitable heating device such as a heating element, or fuel burner furnace.

The heating apparatus is arranged to heat the length of steel to a temperature of between 600° C. and 700° C. as it is conveyed along the heating portion of the processing path. In some embodiments, the heating apparatus may be arranged to heat the length of steel to a temperature of about 610° C. This temperature has been found to provide an optimum level of stress relief with the material. The invention is not limited to these temperatures, and other temperature may be used where appropriate.

The reaction chamber 104 may be formed by an enclosed housing through which the length of steel is conveyed along the processing path. In the described embodiment, the reaction chamber 104 may be formed by a generally elongate tube or the like through which the length of steel may be conveyed. The length of the reaction chamber 104 may be approximately 3.0 m to 5.0 m, however the length is not limited to these examples. The length could be adapted to be less or greater than these examples according to the specific implementation. The reaction chamber may comprise an input aperture and an output aperture at its distal ends through which the steel strip may pass when conveyed along the processing path. The input aperture may be sealably coupled to the output aperture of the heating chamber 102 (either directly, or indirectly by a further coupling). Both of the input and output apertures of the reaction chamber 104 may comprise seals arranged to allow the steel strip to enter and exit while preventing ambient air from entering the reaction chamber.

The apparatus 100 further comprises a control means arranged to control both the temperature of the length of steel and the atmosphere to which it is exposed in the oxidisation portion 112 of the processing path within the reaction chamber 104. In the described embodiment, the control means is provided by the sealed unit defined by the heating chamber 102 and the oxidisation chamber 104. The sealed unit provides improved control of the atmosphere and temperature in comparison to prior art methods where steel is exposed to ambient air within a tempering furnace.

The present invention therefore provides control of the oxidisation reaction occurring on the surface of the steel. By controlling the temperature and atmosphere to which the steel is exposed in a defined region of the reaction chamber the consistency of the oxidising layer produced can be improved. This provides consistency of the oxide layer formation and a consistent colour, and may improve its adherence to the length of steel. By improving consistency of the oxide layer along the length of steel waste may be reduced as more of the output material will meet quality requirements.

The control means may further comprise a first atmosphere controller arranged to generate a non-reactive atmosphere in the portion of the processing path (marked 114 in FIG. 1) preceding the oxidisation portion 112. The non-reactive atmosphere may be generated in the heating portion 110 of the path, and any temperature regulation portion provided before the oxidation portion (as described later). The non-reactive atmosphere may comprise an inert gas arranged to prevent oxidisation of the length of steel from occurring outside of the oxidisation portion of the processing path. By generating an inert atmosphere in a portion of the path preceding the oxidisation portion 112, the oxidisation process may be controlled such that it occurs only in the oxidisation portion 112. This allows the oxidisation to be controlled so that it only occurs when the temperature of the steel is suitable for the optimal production of the oxidised layer. The inert atmosphere therefore advantageously prevents oxidisation form occurring outside of the oxidisation portion to provide improved consistency of the oxidised layer.

The first atmosphere controller may comprise a first inlet 116 arranged to provide a source of pressurised non-reactive gas. The non-reactive gas may comprise nitrogen (e.g. the gas may be purified nitrogen). In other embodiments, another inert gas, or mixture of gases, may be used such as purified argon.

The first inlet 116 may be arranged to extend through a wall of the heating chamber 102 or oxidisation chamber 104 so as to allow the gas to be injected into the sealed unit. The pressurised non-reactive gas may partly or completely flood the heating chamber 102 and a controlled part of the oxidisation chamber (corresponding to the part preceding the oxidisation portion 112 of the processing path) to reduce or prevent oxidisation of the steel in those portions of the processing path. In some embodiments, the first inlet 116 may be located at a position along the processing path immediately after the heating portion 110 i.e. the first inlet 116 may be arranged such that it is immediately following the heating chamber 104 as shown schematically in FIG. 1. In other embodiments, the first inlet 116 may be arranged at any suitable position through the wall of the heating chamber 102 or reaction chamber 104. In yet other embodiments, a plurality of first inlets may be provided to distribute the inert gas through the desired regions of the heating chamber 102 and reaction chamber 104.

The control means may further comprise a second atmosphere controller arranged to generate an oxidising atmosphere in the oxidisation portion 112 of the path. The oxidising atmosphere may comprise a source of oxygen to allow oxidisation of the surface of the length of steel to occur. In the described embodiment, the second atmosphere controller comprises a second inlet 118 through the wall of the reaction chamber 104. The second inlet 118 may allow a supply of oxygen to be injected into the reaction chamber 104 and provided to the oxidising portion 112 of the processing path within the reaction chamber 104. In the described embodiment, the second inlet 118 may be arranged to pass through the wall of the reaction chamber 104 at a position following the point of oxidisation e.g. following the start of the oxidisation portion 112. In other embodiments, a plurality of second inlets may be provided to distribute the gas through the desired regions of the reaction chamber 104.

The second atmosphere controller may be arranged to provide a pressurised source of oxygen gas, which may be in the form of pressured air. In other embodiments, pure oxygen, or other mixtures of gases that comprise oxygen, may be used. The second atmosphere controller may be arranged to flood part, or all, of the reaction chamber 104 with the pressurised source of oxygen. The region of the oxidisation chamber 104 defining the oxidisation portion 112 may be flooded (or at least partly filled) with air. This may provide a controlled atmosphere in which the oxidisation of the steel can take place. In some embodiments, other regions of the oxidation chamber may also be filled with the pressurised source of oxygen. For example, where a second temperature regulation portion of the processing path is provided within the oxidisation chamber (as described below), it may also be flooded with the pressurised source of oxygen.

The second atmosphere controller may provide a source of air in order to increase the dewpoint and facilitate oxidisation. The second atmosphere controller may be arranged to provide gas having a dewpoint of greater than 50° C. (at 80% relative humidity), resulting in a water content of greater than 88 g per kg of air. This has been found to provide optimal consistency during generation of the oxidised layer on the surface of the steel. In other embodiments, other dewpoints and water content levels may be used.

In some embodiments, the second atmosphere controller comprises a heater arranged to heat the pressurised source of oxygen. The heater may comprise a heating element or the like arranged to heat the source of oxygen before it is injected via the second inlet 118. The heater may be arranged to heat the pressurised source of oxygen to a temperature of greater than 55° C. This has been found to provide optimum conditions for the oxidisation of the steel, by minimising the dewpoint variability.

The control means may further comprise an in-line first temperature regulation means arranged to regulate (e.g. heat or cool) the temperature of the steel strip in a first temperature regulation portion 120 of the processing path. The first temperature regulation portion 120 may follow the heating portion 110 and may precede the oxidisation portion 112. This first temperature regulation means may therefore regulate the temperature of the steel when it arrives at the oxidising portion 112. In some embodiments, the first temperature regulation means may comprise a section of the reaction chamber 104 adapted to separate or space apart the heating portion 110 of the processing path from the oxidisation portion 112 to define the temperature regulation portion 120 between them. By spacing the heating portion 110 and the oxidisation portion 112 apart in this way, the length of steel may be allowed to cool between leaving the heating chamber 102 and arriving at the oxidising portion 112. This allows the steel to reduce in temperature from that suitable for stress relieving to occur to the optimum temperature for the oxidisation reaction to occur, which may be significantly less than the stress relieving temperature. In the described embodiment, the first temperature regulation portion is approximately 1 m to 3 m, and preferably 2 m in length to provide a suitable degree of cooling of the steel. In other embodiments, other sizes of temperature regulation portion may be provided.

In some embodiments, the first temperature regulation means may further comprise a fluid cooling device 122 (e.g. a fluid cooling jacket) arranged to supply a flow of coolant to cool the length of steel. The fluid cooling device 122 may be disposed around the oxidisation chamber at, or adjacent, the first temperature regulation portion 120 of the processing path. In some embodiments, the fluid cooling device may be wrapped at least partly around the housing forming the oxidisation chamber 104. In other embodiments, an alternative cooling device may be provided such as a heat sink, coolant bath or chilled inert gas supply.

The first temperature regulation means may be arranged to regulate the length of steel to a temperature between about 420° C. and about 520° C. when the length of steel reaches the oxidisation portion 112. In some embodiments, the first temperature regulation means may be arranged to regulate the length of steel to a temperature of about 440° C. This temperature has been found to provide optimised generation of the oxidised layer on the surface of the length of steel through the reaction:

$$3Fe + 4H_2O <> Fe_3O_4 + 4H_2.$$

In some embodiments, the apparatus 100 may further comprise a viewing means (not shown in the Figures). The viewing means may be arranged to allow the oxidisation portion of the path to be visible from outside of the sealed unit formed by the heating chamber 102 and reaction chamber 104. In some embodiments, the viewing means comprises one or more transparent windows formed in the wall of the reaction chamber 104. The transparent window(s) may be aligned with the oxidisation portion 112 of the processing path such that it is visible to an operator from outside of the reaction chamber 104. The viewing means may allow the operator to perform a visual check on the oxidisation process, e.g. by observing the change in colour of the surface of the length of steel during oxidisation. This may allow the operator to adjust any of the production parameters (e.g. the temperature of the length of steel in the oxidisation portion) as appropriate to tune the oxidisation during production, rather than having to wait and inspect an entire batch of oxidised steel.

In some embodiments, the viewing means may comprise a plurality of separate transparent windows spaced along the length of the reaction chamber 104 (e.g. periodically spaced) so that the oxidisation (or lack of) may be observed at various points along the processing path. In some embodiments, the transparent windows may be periodically spaced along the final part of the length of the oxidisation chamber to facilitate observation (e.g. the final 4 m of the length of the oxidisation chamber 104).

The control means may be arranged to control the position of the oxidisation portion 112 along the length of the processing path. The control means may, for example, be arranged to control the position of the boundary between the heating portion 110 and the oxidisation portion 112, or the boundary between the first temperature regulation portion 120 (where it is included) and the oxidisation portion 112. In some embodiments, the position of the oxidisation portion 112 may be controlled by controlling the inert gas and the source of oxygen provided by the first and second atmosphere controllers. The pressure of the inert gas and the source of oxygen (e.g. the air) may be adjusted, or rebalanced, so that the position of the boundary between the two types of gases within the oxidisation chamber is adjusted. This may allow precise control in relation to the temperature at the oxidisation point. In some embodiments, the position of the start of the oxidisation portion may be controlled so that it is aligned to a position in which the steel has a temperature suitable for oxidisation to occur. In some embodiments, the control means may be arranged to control the position of the oxidisation portion such that it is visible via the viewing means.

In some embodiments, a feedback mechanism may be provided to adjust the position of the oxidisation portion during production. The apparatus may comprise one or more sensors arranged to provide measurements of the temperature and or humidity at the point of oxidisation. These measurements may be provided to a controller arranged to implement a feedback mechanism to control the position of the oxidisation portion according to the sensor measurements.

The apparatus 100 may further comprise a second temperature regulation means arranged to regulate the temperature of the length of steel in a second temperature regulation portion 124 of the processing path following the oxidisation portion 112. The second temperature regulation means may be arranged to cool the length of steel to a temperature suitable for re-coiling or spooling around the output spool 108. In some embodiments, the second temperature regulation portion 112 of the processing path may be within the reaction chamber 104. In other embodiments, it may be outside the reaction chamber 104, or may be partly within and partly following the reaction chamber 104.

In some embodiments, the length of steel may be rapidly cooled to a temperature of below about 70° C. in the second temperature regulation portion 124 of the processing path. The second temperature regulation means may comprise any suitable cooling means and may, for example, be the same as the first temperature regulation means. It may, for example, be a length of the processing path within the reaction chamber in which the steel may be allowed to cool. In some embodiments, the length of the second temperature regulation portion may be approximately 1 m to 3 m, and preferably 2 m to provide adequate pre-cooling. The second temperature regulation portion is not however limited to these sizes and may be larger or small as appropriate. In some embodiments, the second temperature regulation means may comprise a second fluid cooling device 126 disposed at least partly around the reaction chamber 104, or may comprise any other suitable cooling device. In some embodiments, the cooling means may comprise one or more coolant (e.g. water) spray nozzles and/or one or more air blowers to facilitate rapid cooling of the material below 70° C. prior to recoiling or spooling.

The apparatus 100 may further comprise a profile cutter 128 arranged to cut an edge profile of the length of steel. The length of steel may be edge profiled at a cutting portion of the processing path preceding (directly or indirectly) the heating portion. The profile cutter 128 may be any suitable cutting device such as a milling machine, grinding machine, cutting tool heads, or the like. By providing the cutting portion as part of the processing path the edge profiling may be included as part of an inline production process with the stress relieving and oxidisation. This may increase the rate of production of processed steel and may reduce the number of operators required to perform the process. For example, prior art methods may take 3 operators around 154 hours to process 5 tonnes of steel (including edge profiling, tempering, oxidising and cutting to required lengths). The present invention may allow a similar weight of steel to be processed by a single operator in a time of about 45 hours (for reference size 9 mm×0.64 mm). By using a single inline process, the amount of waste material may also be reduced. The present invention therefore provides a significant improvement in efficiency. In other embodiments, the profile cutter may not be included, in which case the length of steel may be pre-profiled before being wound around the input spool 106. In other embodiments, the profile cutter may be provided at any other point along the processing path.

In some embodiments, the conveying means may be arranged to convey the steel in a continuous length along the processing path. The length of steel may, for example, be spooled from the input spool 106 and conveyed through the apparatus 100 without any gaps or cuts in its length. This allows a greater rate of production of stress relieved and oxidised steel compared to prior art batch production methods. It may also allow coil cutting and sizing to occur simultaneously. In some embodiments, the length of steel may be conveyed at a constant rate along the processing path (e.g. the input spool 106 may be rotated continuously to feed the length of steel along the processing path). In other embodiments, the length of steel may be indexed along the processing path (e.g. the input spool may be rotated intermittently). In some embodiments, the conveying means may be arranged to convey the length of steel along the processing path at a rate of between about 0.89 m/s and about 1.52 m/s (175/300 ft/min) and preferably at a rate of about 1.4 m/s (275 ft/min). This provides an improved rate of production compared to prior art production techniques.

Figure 2:
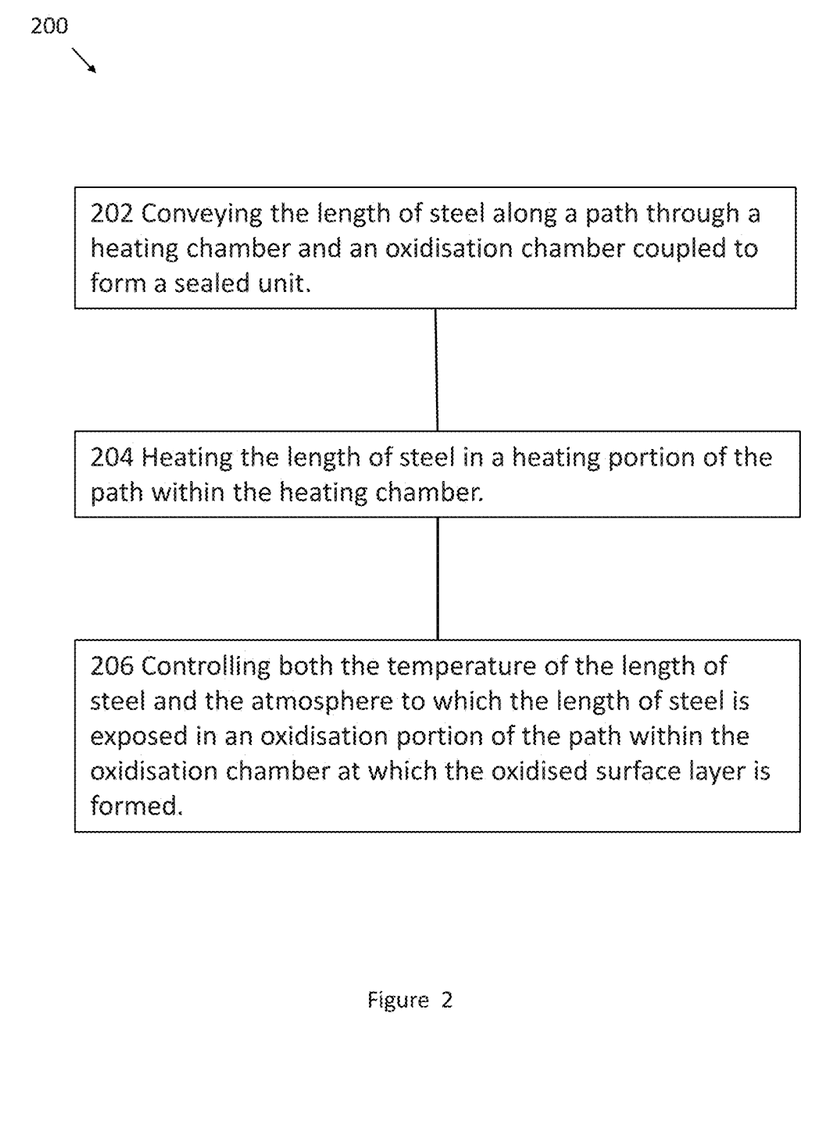
FIG. 2 shows a method of manufacturing a stress-relieved length of steel having an oxidised surface layer according to an embodiment.

In another aspect, the present invention provides a method 200 of manufacturing a stress relieved length of steel having an oxidised surface layer, as shown in FIG. 2.

The method 200 comprises conveying 202 the length of steel along a processing path through the heating chamber 102 and the reaction chamber 104. Conveying the length of steel may comprise unwinding the length of steel from the input spool 106 such that it is fed along the processing path. Along the processing path the length of steel may be supported by rollers or the like as described above. In some embodiments, one or more of the rollers may be driven to convey the length of steel along the processing path.

In some embodiments, the length of steel may be conveyed in a continuous length along the path through the apparatus. In some embodiments, the length of steel may be conveyed at a rate of between 0.89 m/s and 1.52 m/s (175/300 ft/min), and preferably at a rate of about 1.4 m/s (275 ft/min). The length of steel may be conveyed at a continuous rate along the processing path, or in other embodiments the length of steel may be indexed along the path (e.g. the length of steel may be conveyed in discrete movements) as described above.

Once the length of steel (or a portion of its length) is within the heating chamber the method 200 further comprises heating 204 the steel in a heating portion 110 of the processing path. The length of steel may be heated to a temperature of between 600° C. and 700° C., and preferably to a temperature of 610° C., to relieve internal stresses with in the material.

Once it has travelled through the heating chamber 102, the length of steel continues along the processing path such that it travels through the reaction chamber 104. Within the reaction chamber, the length of steel is conveyed along an oxidisation portion 112 of the processing path in which an oxidised layer is created. The oxidisation portion 112 of the processing path may take up part or all of the length of the reaction chamber 104 (in some embodiments, temperature regulation portions 120, 124 of the processing path may be provided within the reaction chamber 104 as described above). Once the length of steel leaves the oxidisation chamber it may be spooled onto the output spool 108.

As the length of steel is conveyed through the heating chamber and reaction chamber it is within a sealed system. This allows the method 200 to control 206 both the temperature of the length of steel and the atmosphere to which the length of steel is exposed in the oxidisation portion 112 of the processing path within the reaction chamber 104. By controlling both of these parameters in a defined oxidisation portion of the processing path a more consistent oxidised layer may be created on the surface of the steel.

The step of controlling 206 the atmosphere in the oxidisation portion 112 of the processing path may comprise generating a non-reactive atmosphere in the portion 114 of the path preceding the oxidisation portion 112. The non-reactive atmosphere may comprise an inert gas arranged to prevent or reduce oxidisation. The non-reactive atmosphere may be generated by injecting inert gas into the oxidisation chamber so that it fills (or partly fills) the heating chamber 102 and in some embodiments fills at least part of the reaction chamber 104. The inert gas may be injected at a position on the processing path immediately following the heating portion 110.

The step of controlling 206 the atmosphere in the oxidisation portion of the path may further comprise generating an oxidising atmosphere in the oxidisation portion of the path. The oxidising atmosphere may comprise a source of oxygen so that the surface of the length of steel may be oxidised as it is conveyed along that part of the processing path. The oxidising atmosphere may be generated by injecting a source of pressurised oxygen (e.g. injecting a gas or mixture of gases that comprises oxygen). The pressurised source of oxygen may be injected at a point within the reaction chamber following the start of the oxidisation portion 112 of the path. This allows the region of the reaction chamber 104 defining the oxidisation portion 112 to be filled (or at least partly filled) by the source of oxygen so that the length of steel is surrounded by an oxygen rich, high-dewpoint atmosphere when it is conveyed along the oxidisation portion 112 of the processing path.

In some embodiments, controlling the atmosphere in the oxidisation portion 112 may further comprise controlling the level of water in the pressurised source of oxygen. This may be done by using ambient air as the pressurised source of oxygen. In some embodiments, the dewpoint is controlled to be greater than 50° C. (at 80% relative humidity), resulting in a water content of greater than 88 g per kg of air. In some embodiments, controlling the atmosphere in the oxidisation portion 112 of the path may further comprise heating the pressurised source of oxygen before it is injected into the reaction chamber. The source of oxygen may be heated to a temperature greater than 55° C. which has been found to provide optimal oxidisation conditions by minimising the dewpoint variability. This results in consistency of the oxidised layer on the surface of the steel. In other embodiments, other temperature, or ambient temperature may however be used.

Controlling the temperature of the length of steel in the oxidisation portion 112 of the path may comprise regulating the temperature of the length of steel as it reaches the oxidisation portion 112 of the processing path. This may be achieved by providing a first temperature regulation portion 120 of the path following the heating portion 110 and preceding the oxidisation portion 112. By regulating the temperature of the length of steel as it arrives at the oxidising portion 112 the material will be at the desired temperature at which oxidisation is to occur in order to provide the desired oxidised layer. This may be particularly important where the length of steel is heated to high temperatures within the heating chamber 102 in order to stress relieve the material. A significantly lower temperature may be required for the desired oxidised layer to be formed on the surface of the steel compared to the temperature required for the stress relieving process.

Regulating the temperature of the length of steel may comprise conveying the length of steel along the temperature regulation portion of the path during which time it will reduce in temperature (e.g. it will cool as it is no longer being heated by the heat source of the heating chamber) before arriving at the oxidisation portion 112. The oxidisation chamber 104 may therefore space apart the heating portion 110 of the path from the oxidisation portion 112 to define the first temperature regulation portion 120 there between. In some embodiments, the length of the temperature regulation portion 120 (e.g. the length of the region of the oxidisation chamber which defines the first temperature regulation portion 120) may be chosen to achieve the desired level of cooling by the time the length of steel arrives at the oxidisation portion 112.

In other embodiments, the position of the start of the oxidisation portion 112 may be varied in order to change the length of the first temperature regulation portion 120. This may vary the degree of temperature change within the temperature regulation portion 120. The position of the start of the oxidisation portion 112 may be varied by altering the rate at which the inert gas and oxygen containing gas (e.g. air) are injected into the reaction chamber 104 (or by varying the pressure at which they are injected). In other embodiments, the position of the first inlet 116 and the second inlet 118 may be tailored to adjust the position of the start of the oxidisation portion 112.

The position of the oxidisation portion may also be varied as described above such that it is visible via the viewing means adapted to allow the oxidisation portion 112 of the processing path to be visible from outside of the sealed unit form by the reaction chamber 104 and the heating chamber 102. This may allow the oxidisation process to be observed during production so that adjustments to process can be made accordingly.

In some embodiments, regulating the temperature of the length of steel may further comprise actively cooling the length of steel as it passes along the first temperature regulation portion 120. This may be done by flowing coolant through a fluid cooling device disposed at least partly around the reaction chamber 104 at or adjacent to the first temperature regulation portion 120. In other embodiments, other methods of actively cooling the length of steel may be provided such as passing the reaction chamber 104 through a coolant bath or using an alternative cooling device such as a heat sink.

As discussed above, the length of steel is regulated to a temperature of between 420° C. and 520° C. and preferably to about 440° C. when it reaches the oxidisation portion 112 of the processing path. These temperatures have been found to generate an oxidised layer having the desired properties through the reaction: $3Fe+4H_2O< >Fe_3O_4+4H_2$.

The method 200 may further comprise regulating the temperature of the length of steel in a second temperature regulation portion 124 of the processing path. The second temperature regulation portion 124 of the path may follow the oxidisation portion 112, and may be within, partly within, or outside of the reaction chamber 104.

As the length of steel is conveyed along the second temperature regulation portion 124 the steel may be cooled to a temperature suitable for winding the steel around the output spool 108. In some embodiments, the length of steel may be cooled to below 70° C. In some embodiments, the length of steel may be allowed to cool naturally as it passes along the second temperature regulation portion 124. In other embodiments, it may be actively cooled using a fluid cooling device other or suitable cooling device (which may be the same as provided for the first temperature regulation portion). In some embodiments, the cooling may be provided by spraying or blowing coolant (e.g. water or air) across the surface of the steel strip.

In some embodiments, the method 200 may further comprise cutting a profile into the edge or edges of the length of steel in a profile cutting portion of the path preceding the heating portion 110. This allows the edge cutting to be done in the same process as stress relieving and oxidising. This may improve the rate of production compared to prior art methods where edge profiling is done separately.

The invention claimed is:

1. An apparatus for manufacturing a stress relieved length of steel having an oxidised surface layer, the apparatus comprising:
   a heating chamber;
   a reaction chamber, wherein an input aperture of the reaction chamber is sealably coupled to an output aperture of the heating chamber to form a sealed unit; and
   a conveying mechanism arranged to convey the length of steel along a path through the heating chamber and reaction chamber,
   wherein the heating chamber comprises a heating apparatus arranged to heat the length of steel in a heating portion of the path, and
   wherein the apparatus further comprises a control means comprising the sealed unit defined by the heating chamber and the reaction chamber, the control means further comprising:
   a first atmosphere controller arranged to generate a non-reactive atmosphere in a portion of the path through the heating chamber and reaction chamber, the non-reactive atmosphere comprising an inert gas arranged to prevent or reduce oxidisation; and
   a second atmosphere controller arranged to generate an oxidising atmosphere in an oxidisation portion of the path through the heating chamber and reaction chamber, the oxidising atmosphere comprising a source of oxygen, and wherein
   the first atmosphere controller is arranged to generate the non-reactive atmosphere in a portion of the path preceding the oxidisation portion, and
   the control means is arranged to control the inert gas and source of oxygen provided by the first and second atmosphere controllers to adjust the position of the oxidation portion along the length of the path whereby both the temperature of the length of steel and the atmosphere to which the length of steel is exposed in the oxidisation portion is controlled.

2. The apparatus according to claim 1, wherein the first atmosphere controller comprises a first inlet arranged to provide a source of pressurised inert gas.

3. The apparatus according to claim 2, wherein:
   (a) the first atmosphere controller is arranged to flood the heating chamber and a controlled portion of the reaction chamber with the inert gas, or
   (b) the inert gas comprises nitrogen, or
   (c) both the first atmosphere controller is arranged to flood the heating chamber and a controlled portion of the reaction chamber with the inert gas and the inert gas comprises nitrogen.

4. The apparatus according to claim 1, wherein the second atmosphere controller comprises a second inlet arranged to provide a pressurised source of oxygen.

5. The apparatus according to claim 4 wherein the second inlet is arranged to pass through a wall of the reaction chamber at a position following the start of the oxidisation portion of the path, and, optionally, the source of oxygen comprises air and, further optionally, the second atmosphere controller is arranged to provide gas having a dewpoint of greater than 50° C. (at 80% relative humidity), resulting in a water content of greater than 88 g/kg of air.

6. The apparatus according to claim 4, wherein the second atmosphere controller comprises a heater to heat the pressurised source of oxygen.

7. The apparatus according to claim 1, wherein the control means further comprises a first temperature regulation means arranged to regulate the temperature of the length of steel in a first temperature regulation portion of the path, the first temperature regulation portion following the heating portion and preceding the oxidisation portion.

8. The apparatus according to claim 7, wherein the first temperature regulation means comprises a section of the reaction chamber adapted to separate the heating portion of the path from the oxidisation portion of the path to define the first temperature regulation portion therebetween and optionally wherein the first temperature regulation means further comprises a fluid cooling device disposed around the reaction chamber at or adjacent the first temperature regulation portion.

9. The apparatus according to claim 7, wherein the first temperature regulation means is arranged to regulate the length of steel to a temperature between 420° and 520° C. when the length of steel reaches the oxidisation portion.

10. The apparatus according to claim 1, further comprising one or more of:
   (a) the heating apparatus of the heating chamber comprises an induction heating device,
   (b) the heating apparatus is arranged to heat the length of steel to a temperature of between 600° C. to 700° C.,
   (c) the apparatus further comprises a second temperature regulation means arranged to regulate the temperature of the steel in a second temperature regulation portion of the path following the oxidisation portion, and optionally further comprising any one or more of: i) the second temperature regulation means is arranged to cool the steel to a temperature of less than 70° C., ii) the second temperature regulation means comprises a cooling means comprising one or more coolant spray nozzles, or iii) the second temperature regulation means comprises a cooling means comprising one or more air blowers arranged to flow coolant over the surface of the steel strip,
   (d) the control means is arranged to control the temperature of the length of steel when in the oxidation portion of the path to about 440° C. and the atmosphere to which the length of steel is exposed in the oxidisation portion contains water/air ratio of greater than 88 g/kg,
   (e) the apparatus further comprises a profile cutter arranged to cut an edge profile of the length of steel in a profile cutting portion of the path preceding the heating portion,
   (f) the conveying means is arranged to convey the length of steel in a continuous length along the path through the apparatus, and optionally the conveying means is arranged to convey the length of steel at a rate of between 0.89 m/s and 1.52 m/s (175/300 ft/min), or
   (g) the control means is arranged to control both the temperature of the length of steel and the atmosphere to which the length of steel is exposed to form the oxidised layer by the reaction: $3Fe+4H_2O< >Fe_3O_4+4H_2$.

11. A method of manufacturing a stress relieved length of steel having an oxidised surface layer, the method comprising the following steps:
   conveying the length of steel along a path through a heating chamber and a reaction chamber, wherein an input aperture of the reaction chamber is sealably coupled to an output aperture of the heating chamber to form a sealed unit;
   heating the length of steel in a heating portion of the path within the heating chamber; and controlling both the temperature of the length of steel and the atmosphere to which the length of steel is exposed in an oxidisation portion of the path within the reaction chamber at which the oxidised surface layer is formed, wherein controlling the atmosphere in the oxidisation portion of the path comprises:

generating a non-reactive atmosphere in the portion of the path preceding the oxidisation portion, the non-reactive atmosphere comprising an inert gas arranged to prevent or reduce oxidisation;

generating an oxidising atmosphere in the oxidisation portion of the path, the oxidising atmosphere comprising a source of oxygen, and controlling the position of the oxidisation portion along a length of the path by controlling the inert gas and source of oxygen to adjust the position of the oxidation portion along the length of the path.

12. The method according to claim 11, wherein:
(a) generating the non-reactive atmosphere comprises injecting an inert gas, or
(b) the inert gas comprises nitrogen, or
(c) both the non-reactive atmosphere comprises injecting an inert gas and the inert gas comprises nitrogen.

13. The method according to claim 11, wherein generating the oxidising atmosphere comprises injecting a source of pressurised oxygen.

14. The method according to claim 13, wherein the pressurised source of oxygen is injected at a point within the oxidisation chamber following the start of the oxidisation portion of the path.

15. The method according to claim 14, further comprising one or more of:
(a) the pressured source of oxygen comprises air;
(b) controlling the atmosphere in the oxidisation portion of the path further comprises controlling the level of water in the pressurised source of oxygen and optionally the level of water is controlled to be greater than 88 g/kg of air; or
(c) controlling the atmosphere in the oxidisation portion of the path further comprises heating the pressurised source of oxygen.

16. The method according to claim 11, wherein controlling the temperature of the length of steel in the oxidisation portion of the path comprises regulating the temperature of the length of steel in a first temperature regulation portion of the path, the first temperature regulation portion following the heating portion and preceding the oxidisation portion.

17. The method according to claim 16, further comprising one or more of:
(a) regulating the temperature of the length of steel comprises spacing apart the heating portion of the path from the oxidisation portion of the path to define the first temperature regulation portion therebetween;
(b) regulating the temperature of the length of steel comprises flowing coolant through a cooling device disposed at least partly around the oxidisation chamber at or adjacent the first temperature regulation portion; or
(c) the length of steel is regulated to a temperature of between 420° C. and 520° C. when the length of steel reaches the oxidisation portion.

18. The method according to claim 11, further comprising one or more of:
(a) the length of steel is heated by an induction heating device;
(b) the length of steel is heated to a temperature of between 600° C. and 700° C.;
(c) the method further comprises regulating the temperature of the length of steel in a second temperature regulation portion of the path following the oxidisation portion, wherein optionally regulating the temperature of the length of steel comprises cooling the steel below 70° C.;
(d) the temperature of the length of steel in the oxidation portion is controlled to be about 440° C. and the atmosphere to which the length of steel is exposed in the oxidisation region is controlled to contain a water/air ratio above 88 g/kg;
(e) the temperature of the length of steel and the atmosphere to which the length of steel is exposed are controlled to provide oxidisation by the reaction: $3Fe + 4H_2O <\ > Fe_3O_4 + 4H_2$;
(f) the method further comprises cutting an edge profile of the length of steel in a profile cutting portion of the path preceding the heating portion;
(g) the length of steel is conveyed in a continuous length along the path through the apparatus; or
(h) the length of steel is conveyed at a rate of between 0.89 m/s and 1.52 m/s (175/300 ft/min).

* * * * *